INVENTOR.
HENRY R. VON ARX
BY Lothrop & West
ATTORNEYS

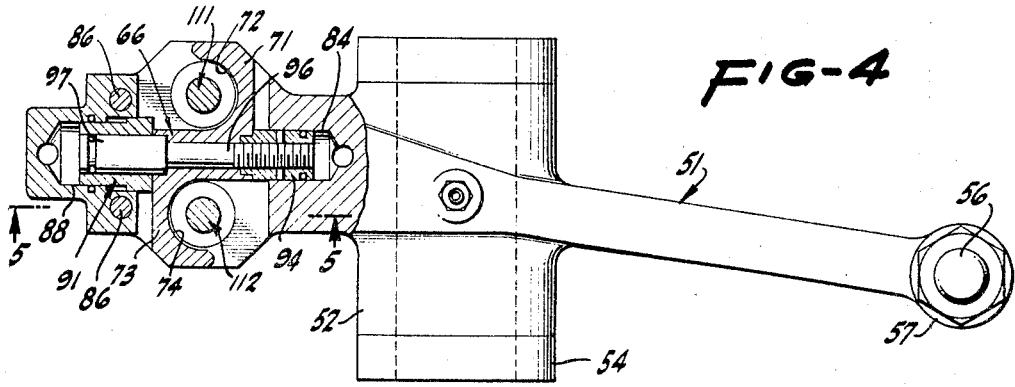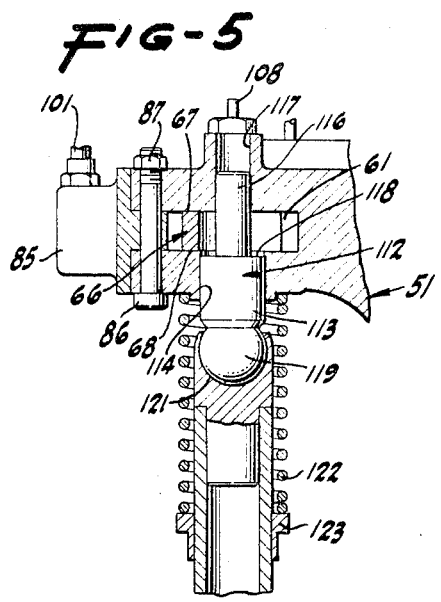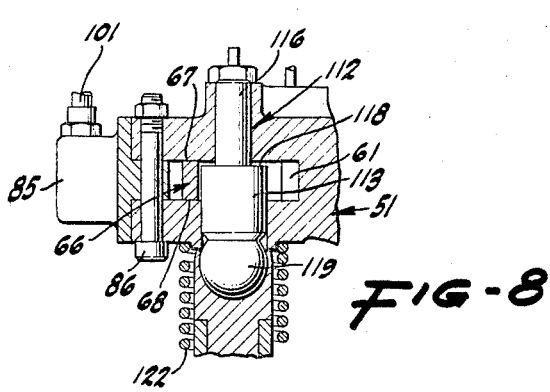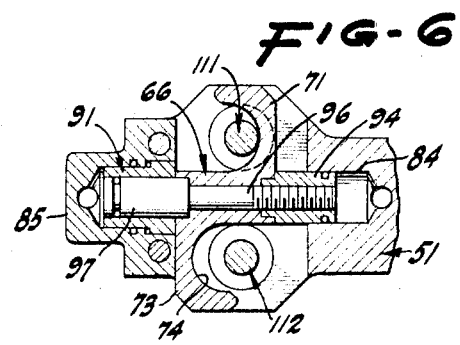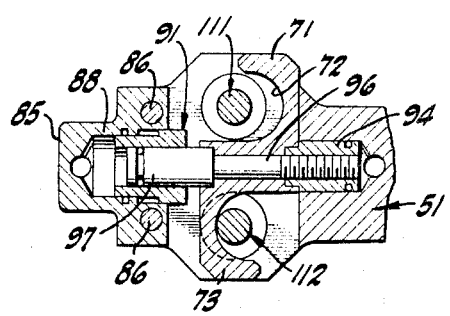
INVENTOR.
HENRY R. von ARX
BY Lothrop & West
ATTORNEYS 3,273,546
VALVE TIMING SELECTOR
Henry R. von Arx, Berkeley, Calif., assignor to General Metals Corporation, Oakland, Calif., a corporation of California
Filed Jan. 24, 1964, Ser. No. 340,053
8 Claims. (Cl. 123—90)

The invention relates primarily to means especially useful in connection with internal combustion reciprocating engines employing poppet valves and having cams on a cam shaft for actuating the valves. While the invention can readily be applied to all sorts of engines, as well as compressors and other valved machines, it is especially useful in connection with compression ignition or so-called diesel engines which must be directly reversed. By direct reversal, I refer to the reversal of the direction of rotation of the engine crank shaft itself by varying or changing the valve timing. In many installations of larger size engines, particularly for marine use in which the engines normally operate forwardly for a protracted period but may be called upon to reverse promptly at any time, it is customary to employ a cam shaft that is axially movable to bring into effect one or another of two or more sets of cams for each cylinder. The cam drive appropriate valve actuating mechanisms operating in directions normal to the axis of the cam shaft. Shifting the cam shaft axially requires either approximately conical ramps between the various cams or shifting of the valve actuating tappets while the cam shaft is being shifted and then restoring the actuating tappets on the newly positioned cams. Either of these expedients has unsatisfactory characteristics. The ramps are subject to extreme wear and are difficult to fabricate. Considerable force is required to shift the shaft and the cam shaft drive and end thrust mechanisms are elaborate. The valve tappet shifting structure is awkward in that it requires a great deal of additional mechanism, some way of inter-relating the temporary tappet shifting device with the cam shaft shifting structure and exposes cams and tappet rollers to shock loading and therefore wear.

It is an object of the present invention to provide means for reversing the engine by altering its valve timing without axially shifting the cam shaft and without providing any temporary tappet shifting structure.

Another object of the invention is to provide a structure which can readily be incorporated with engines of current design and already built without substantial major alteration.

Another object of the invention is to provide a valve timing selector which can readily be operated by the power mechanism normally available with the engine.

Another object of the invention is to provide a valve timing selector which is instantly operable whenever required.

A still further object of the invention is to provide a valve timing selector which is easy and inexpensive to manufacture and which has a long operational life.

Other objects of the invention together with the foregoing are attained in the embodiment of the invention described in the accompanying description and illustrated in the accompany drawings, in which:

FIGURE 4 is a plan of the operator or rocker shown in FIGURE 3, a portion of the structure being shown in cross section on a horizontal plane, some parts being in neutral position;

FIGURE 5 is a fragmentary cross section, the plane of which is indicated by the line 5—5 of FIGURE 4, some parts being in neutral position;

FIGURE 6 is a fragmentary cross section similar to the cross sectional part of FIGURE 4, but showing some parts in one extreme position;

FIGURE 7 is a view comparable to FIGURE 6, but showing some parts in another extreme position; and FIGURE 8 is a fragmentary cross section similar to FIGURE 5, but showing some parts in a different position.

Figure 1:
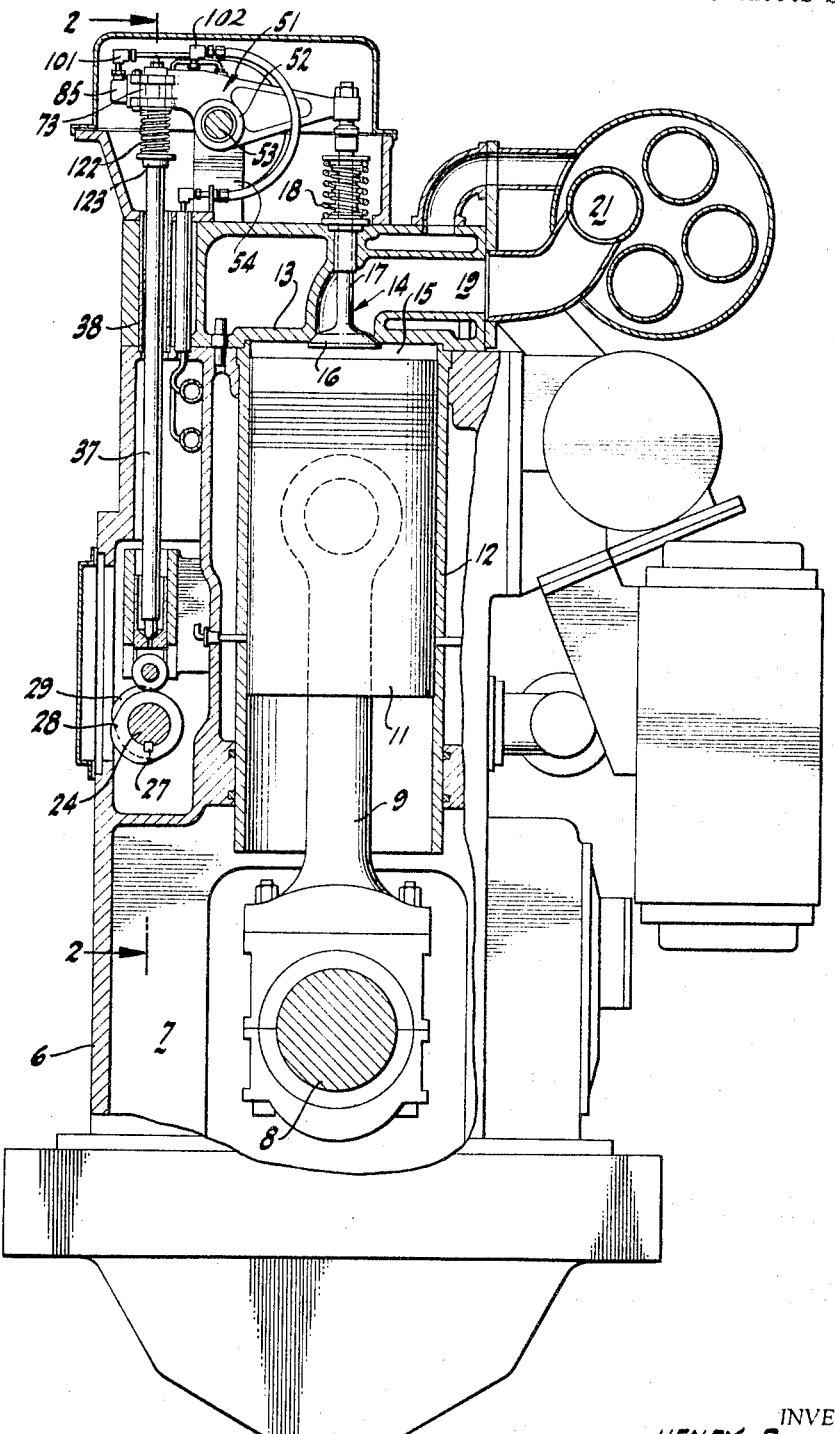
FIGURE 1 is a cross section on a vertical transverse plane through an internal combustion engine provided with the valve timing selector of the invention, some of the engine parts being shown diagrammatically.

While the valve timing selector is equally useful in a number of different environments, for example, in dual fuel and spark ignition engines, the example disclosed herein is an application to an air starting, marine style, reversing internal combustion engine with compression ignition. For the most part, the engine is standard and includes a frame 6 and a crank case 7 within which a crank shaft 8 revolves. On the cranks of the crank shaft are disposed connecting rods 9 joined to reciprocating pistons 11 movable within cylinder liners 12 mounted in the frame 6. In each cylinder the cylinder liner 12 is closed at one end by a head 13 within which a poppet valve 14 is reciprocably mounted. In most designs two valves are utilized for each combustion chamber 15; namely, an inlet valve and an exhaust valve. In some designs, but one valve is utilized in each cylinder, this usually being an air inlet valve with exhaust taking place through a ring of ports (not shown) around the lower portion of the cylinder liner. If the engine operates as a diesel engine, there is provided a fuel injector discharging into the combustion chamber. For clarity of illustration herein, the fuel injector is not illustrated and but a single valve is shown per cylinder. It is to be understood that for each valve in each cylinder, a complete valve actuating mechanism is individually arranged in accordance with the disclosure herein. The representative valve 14 includes a valve head 16 joined to a stem 17 ending above the cylinder head 13 and being provided with closure springs 18 in the usual fashion. As shown in FIGURE 1, the valve controls a flow passage 19 between the combustion chamber 15 and a manifold 21.

Figure 2:
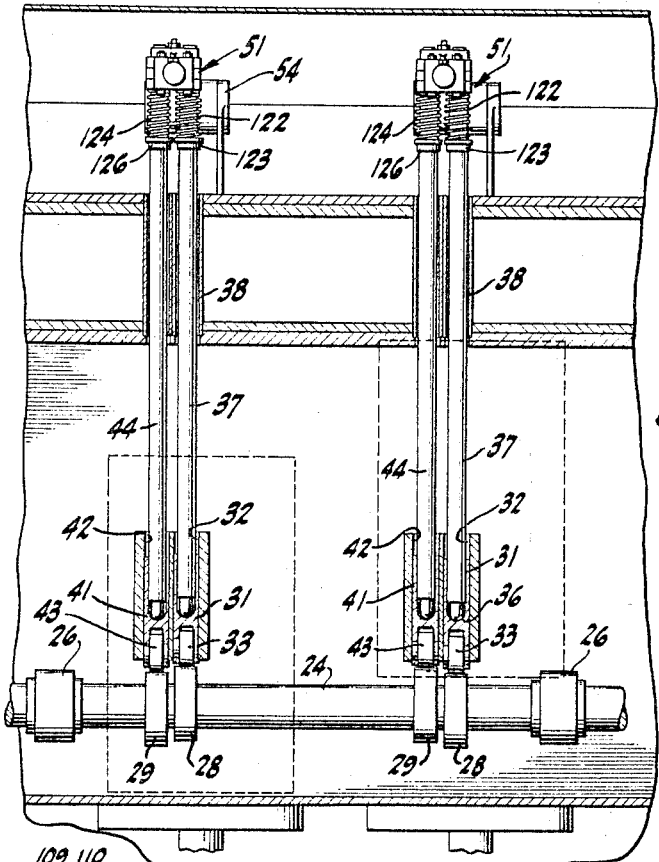
FIGURE 2 is a cross section of a portion of the structure of FIGURE 1, the plane of section being indicated by the line 2—2 of FIGURE 1, the showing being in part diagrammatic.

As customary, the engine is provided with a longitudinally extending cam shaft 24 arranged with its axis parallel to the rotational axis of the crank shaft 8 and appropriately coupled to the crank shaft by intermediate drive gearing (not shown). The drive gearing produces appropriate rotation of the cam shaft relative to the crank shaft, in this case at one-half crank shaft speed. In the present instance, the cam shaft 24 is not axially translatable within the frame 6, but is held against end thrust by appropriate supporting bearings 26 (FIGURE 2).

Pursuant to the present invention, the cam shaft 24 is provided with a special array of cams thereon. These are shown herein as separate cams mounted on the cam shaft by means of appropriate keys 27. Since a multi-cylinder engine is illustrated and since the arrangement for each cylinder is just like that of the others, and since but a single valve per cylinder is illustrated for clarity, the cam shaft is illustrated, particularly in FIGURE 2, as having for each cylinder a first cam 28 and a second cam 29 for each valve of that cylinder. These cams are not identical. In most instances the contour of the cam 28 is such as to afford forward rotation of the engine, whereas the cam 29 is of such shape as to afford reverse rotation of the engine. In an instance wherein the engine is not to be reversed, the cam contours may be such as to afford a different timing for the same rotational direction; for example, a different timing of the valve for high load than for low or no load operation. For whatever reason, the contours of the cams are distinctly different.

The forward cam 28 (so called for convenience) has associated with it a cam follower 31. This is in the form of a cylindrical plunger operable within a cylindrical guide 32 formed in part of the crank case 7 and guiding the follower to rectilinear motion normal to the cam shaft axis. A roller 33 is appropriately journalled on a cross axis near the bottom of the plunger 31 and partakes of the motion imparted to it by the rotating cam 28. The follower 31 in the customary fashion provides a seat 36 for the lower end of a pushrod 37 extending upwardly of the engine frame 6 through an appropriate passageway 38 therein and terminating in the vicinity of the valve 14. Comparably, the reverse cam 29 (so called for convenience) is likewise provided with a follower 41 operable within a cylindrical guide 42 and carrying a roller 43 at its lower end to follow the cam 29. The follower 41 is in engagement with the lower end of a second pushrod 44 likewise passing through the opening 38 and terminating near the valve 14. The rollers, followers and pushrods can be considered as a cam train for translating the rotary motion of the cams to a timed reciprocation of the pushrods.

The valve 14 is associated with a valve operator 51 in the form of a rocker having a pivotal boss 52 journalled on a rocker shaft 53 concentric with a cross axis and carried in brackets 54 on the engine head. The valve end of the rocker, as especially shown in FIGURE 3, carries an adjuster 56 screw threaded into a boss 57 at the end of the rocker and enlarged to provide a hemispherical bearing surface 58. A wear button 59 having a comparable hemispherical contour rests against the member 56 and also bears upon a wear button 60 capping the upper end of the valve stem 17. The pivotal or oscillating motion of the rocker 51 about the cross axis is thus appropriately transmitted to reciprocate the valve stem 17 to open the valve, which is closed in the customary fashion by the springs 18.

Pursuant to the invention and in distinction to the customary arrangement in which but a single pushrod actuates a single rocker, in the present instance I provide means for operating the rocker 51 by either one of the pushrods 37 or 44 and thus imparting to the valve 14 an operating cycle or timing cycle governed by either the forward cam 28 or the reverse cam 29.

The rocker 51 on its arm opposite the valve is especially enlarged to provide a cross or transverse chamber 61 having a rectangular cross section as defined by an upper, flat wall 62 and a parallel, lower, flat wall 63. The chamber opens outwardly on opposite sides of the rocker and is enlarged laterally by extensions of the walls 62 and 63 for support purposes.

Disposed on the rocker 51 and within the chamber 61 is a slide 66. This conveniently is a block of relatively hard metal having at least in part a rectangular transverse cross sectional shape. The slide is readily reciprocable within the chamber 61 in a direction normal to the cross axis of the rocker shaft 53 but is restrained from rotation relative to the rocker 51. The slide is provided with a flat upper surface 67 and a flat lower surface 68 readily engageable with and slidable on the walls 62 and 63. The slide is formed with a first abutment 71 extending in one direction parallel to the cross axis of the rocker shaft 53 and in effect extending from one side of the chamber 61. This abutment has the contour, in plan, of a hook facing in one direction; that is, away from the valve 14. The upper and lower surfaces of the hook are parallel, but the inner defining surface 72 is substantially semicircular. The other side of the slide is formed with a second abutment 73 extending in the opposite direction parallel to the cross axis of the rocker shaft 53 and in effect out of the other side of the chamber 61. The second abutment 73 has substantially planar upper and lower surfaces and has a hook configuration faced in the opposite direction from the hook configuration of the abutment 71; that is, toward the valve 14. A semicircular surface 74 in part defines the hook configuration of the second abutment 73.

Means are provided for moving or reciprocating the slide 66 in a direction normal to the cross axis of the rocker shaft 53 to occupy three positions within the chamber and relative to the rocker 51. Since compressed air and lubricating oil under pressure are available and since I prefer to ultilize a pressure fluid actuating mechanism, the rocker is provided with a cylinder 81 of relatively large diameter which opens to the chamber 61 at one end. The diameter of the cylinder is greater than the height of the chamber, so that there is provided a pair of lunar shoulders 82 and 83 at the intersection of the larger cylinder and the chamber. On the same axis or in alignment with the cylinder 81 is a smaller cylinder 84 which opens to the chamber without shoulders. The end of the smaller cylinder 84 is closed by the remaining material of the rocker 51, whereas the end of the larger cylinder 81 is closed by an applied cap 85 removably secured in position by through bolts 86 and appropriate nuts 87 (FIGURES 4 and 5). In fact, the closure cap 85 is itself provided with a cylindrical cavity 88 of slightly lesser diameter than that of the larger cylinder 81 to form a shoulder 89.

Disposed within the larger cylinder 81 is a ring 91 having a smaller diameter portion 92 reciprocable within the cavity 88 and having a larger portion 93 reciprocable within the larger cylinder 81 between the lunar shoulders 82 and 83 and the shoulder 89 as end limits. A piston 94 is reciprocable within the smaller cylinder 84. In order to carry the slide with it, the piston 94 is threadedly engaged with a rod 96 which passes through the center of the slide 66 and then terminates in a piston 97 of smaller diameter than the piston 94 and reciprocable within the interior bore 98 of the ring 91.

In order that the pistons and the ring can be selectively operated, the end of the cap 85 is provided with a flexible hose 101 connected to a supply of pressure fluid. Similarly, the end of the cylinder 84 is connected by a flexible hose 102 to the same supply of pressure fluid. While this supply of pressure fluid is not illustrated, it is customarily the compressed air tank normally available in connection with an engine of the type disclosed. Alternatively, the fluid can be a supply of hydraulic liquid under pressure such as is available in the lubricating system of the engine or in some auxiliary system. Since air actuation is preferred, the hoses 101 and 102 are connected to the air supply and to exhaust through standard valving permitting air to be supplied to the hose 101 while the remaining hose 102 is connected to exhaust, or permitting air to be supplied under pressure to the hose 102 while the hose 101 is connected to exhaust. Alternatively, the arrangement of the valving is such that air can be supplied under pressure simultaneously to both of the hoses 101 and 102 or, alternatively, to neither of the hoses 101 and 102.

In the event air is supplied to the hose 101 while the hose 102 is connected to exhaust, then air under pressure is effective upon one end of the piston 97 and also upon the ring 91. Pressure is then exerted both on the small piston 97 and the ring 91. These are thus translated as far as possible to the right as seen in FIGURE 7, at least until such time as the ring 91 abuts the shoulders 82 and 83 and until the slide 66 comes into abutment with the end wall of the cross chamber as shown in FIGURE 7.

Figure 3:
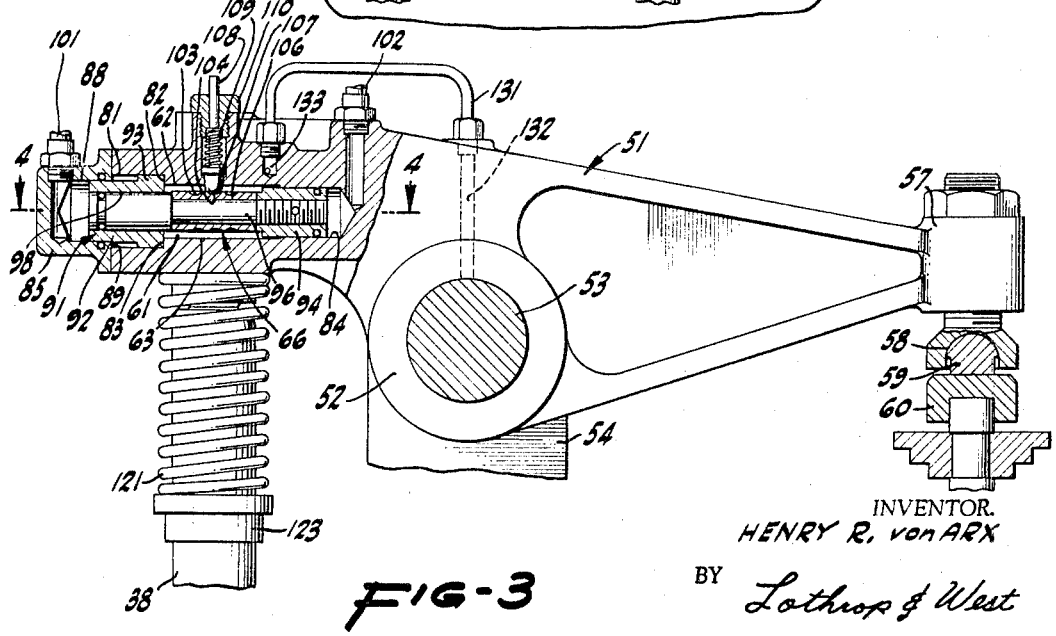
FIGURE 3 is a side elevation to an enlarged scale of a valve operator or rocker, certain portions being broken away in cross section on a vertical plane, and some parts being in neutral position.

When pressure is released from the hose 101 and is supplied to the hose 102, then there is no force on the ring nor the piston 97 toward the right, but there is pressure on the piston 94 exerted toward the left in FIGURE 3 and effective then to translate the slide to the left until such time as the slide has come into abutment with the other wall of the cross chamber, provided by the cap 85, in another extreme position, as shown in FIGURE 6.

It is desirable under certain circumstances to have a fixed neutral position. Although this position is passed through during a change, it is not directly involved in the forward and reverse operation of the engine. When pressure is exerted through both hoses 101 and 102 simultaneously on all of the reciprocable members, the ring 91 is translated to a position against the shoulders 82 and 83 and there is pressure (toward the right in FIGURE 3) on the end of the smaller piston 97. This, however, is overcome by pressure on the larger piston 94. This is sufficient to drive the slide to the left in FIGURE 3 until such time as the slide is in abutment with the face of the ring 91. The area of the piston 94 is less than the effective area of the ring 91 and piston 97 combined, so that the ring stays in position against the shoulders and the slide is thus arrested and held in an intermediate or neutral position, as shown particularly in FIGURE 4.

When pressure is relieved from both of the hoses 101 and 102, then no force is exerted upon the slide, which remains in any of its three positions unless extraneously dislodged. In order to afford some positioning influence, especially against minor shocks and vibrations, the slide 66 is provided with position depressions 103, 104 and 106 to receive a detent button 107 at the end of a stem 108. The button is urged toward the slide by a spring 109 and the stem 108 projects above a mounting cap 110 to afford easy disassembly of the slide. These means afford not only a slide forcibly movable between one extreme or forward position, another extreme or reverse position, and an intermediate or neutral position, but also a slide which can retain any of these shifted positions.

The movable slide is utilized to interengage the cam follower mechanisms selectively with the valve operator. For this reason, the rocker 51 at either side of the slide actuating mechanism is provided with a pair of tappets 111 and 112. These tappets are similar. Each of them comprises a relatively large cylindrical portion 113 movable or slidable within one of a pair of cylindrical bores 114 in the rocker 51 and opening at the upper end into the cross chamber 61. In alignment with the enlarged portion 113 is a reduced portion 116 itself reciprocable within one of a pair of small bores 117 in the rocker 51. The bores 117 are in vertical axial alignment with the bores 114 and at the lower end open into the chamber 61. Each tappet is thus guided both above and below the cross chamber.

The tappet formation is such as to afford a flat surface 118 constituting a shoulder. In one position of the tappet, the shoulder is substantially flush with the lower wall of the cross chamber. In another position of the tappet, the shoulder surface 118 is slightly below the upper wall of the cross chamber. At their lower end, both of the tappets have nearly spherical balls 119 cooperating with hollow semispherical sockets 121 at the upper end of the respective pushrods 44 or 37. The larger portion 113 of each of the tappets has approximately the same cylindrical configuration as the arcuate surfaces 72 and 74 of the slide abutment hooks, whereas the smaller portion 116 of the tappets can well be accommodated within the hooks regardless of slide position.

Each of the pushrods 37 and 44 thus is connected to its respective one of the two tappets. The cam motions are imparted directly to the tappets. Either or both of the tappets can reciprocate within the respective aligned bores in the rocker 51.

In order to urge the tappets toward their respective cams, a helical spring 122 is mounted on the pushrod 37 against a collar 123 thereon and the spring at its other end abuts the under surface of the rocker 51. Similarly, a spring 124 surrounds the pushrod 44, rests against a collar 126 thereon, and at its upper end also abuts the rocker 51.

In the customary operation of this device, if the engine is not to operate, the slide is put in its intermediate or neutral position as shown in FIGURES 3 and 4 by the exertion of pressure through both of the flexible hoses 101 and 102. Since the slide is in neutral position, it is not connected to either of the tappets. If the crank shaft 8 is barred over or rotated by outside means, this simultaneously revolves the cam shaft 24 and both of the cams 28 and 29 and through the followers 31 and 41 correspondingly reciprocates the pushrods 37 and 44. Both of the tappets are correspondingly and idly reciprocated within the stationary rocker 51 in accordance with the time cycle imposed by their respective cams.

If the engine is then to be actively operated in a forward direction, for example, air pressure is supplied to the hose 101 while the hose 102 is vented. The slide is translated from the neutral position shown in FIGURE 4 into its forward extreme position, as shown in FIGURE 7. As the slide is thus translated, the abutment hook 73 is similarly translated and rides in the cross chamber into a position in the path of reciprocation of the shoulder 118 on the tappet for the pushrod 37 associated with the forward cam 28. Simultaneously the hook 71 retreats from proximity to the tappet for the pushrod 44. Under these circumstances, when the forward cam 28 lifts the pushrod 37 and correspondingly tends to lift the corresponding tappet, the tappet can no longer reciprocate within or with respect to the rocker 51, since the hook 73 serves to block that reciprocatory motion. Thereafter the rocker 51 is moved concurrently with the movement of the tappet. The valve 14 is thus operated with appropriate timing for forward engine rotation. This operation can continue indefinitely until it is desired to reverse the engine.

For reverse operation, pressure is supplied to the flexible hose 102, while the hose 101 is connected to exhaust. The slide is then reciprocated or translated from its position shown in FIGURE 7 through the intermediate FIGURE 4 position and into the reverse position shown in FIGURE 6. During this motion the hook 73 is moved out of the path of the forward tappet and is positioned in a remote location with respect thereto, while the hook 71 is moved to intersect the path of the reverse tappet associated with the pushrod 44 and then serves as a block to any upward movement of that tappet with regard to the rocker 51. Under these circumstances, the rocker then partakes of the motion imparted by the reverse cam 29 and the engine can be operated indefinitely in the reverse direction.

The engine can always be shifted from forward to reverse rotation and also from reverse to forward rotation without any difficulty. There are certain times in the cycling of the engine in which the shift occurs without any interference. There are other times when there may be temporary interference. For example, if the pushrod 37 is in a raised position and has lifted it tappet 112 into the shifting path of the hook 73 from the position shown in FIGURE 6 into the position shown in FIGURE 7, then the arcuate face 74 of the hook 73 cannot be translated because the enlarged cylindrical portion 113 of the tappet is in its way. Yet, the air pressure is being continuously exerted within the chamber 88 to urge the translation to take place. Since the engine is rotating (by air or separate means in starting), the cam 28 is also rotating and the pushrod 37 drops at the proper time in the cycle to lower the enlarged portion 113 of the tappet. This puts the smaller portion 116 is position so that the way is no longer blocked and the slide shift can then be completed. Stated differently, while the shift from forward to reverse and vice versa can be initiated at any time, it may require a partial rotation of the engine in order for the shift to be completed. Since engines of this class are always rotatable by the compressed air supply or other starting arrangements or are operating under their own power, if it always feasible to effectuate the shift.

In the event the shifting mechanism is operated hydraulically, particularly with lubricating oil, no extra lubrication is necessary. In the event compressed air is utilized, as disclosed herein, means are provided for lubricating the various parts from the main engine lubrication system. For that reason, a duct 131 is joined to one of the main lubricating passages 132 in the rocker 51 and is extended to a passage 133 within the enlarged end of the rocker and from which lubricant is conducted through drilled passages to the various relatively moving parts of the structure.

With the disclosed arrangement, it is not necessary to provide an axially shifting cam shaft, nor is it necessary to provide any kind of tappet shifting mechanism. Standard parts such as cams, pushrods, followers and valves are utilized. Special construction of one end of the rocker arm and tappets and the provision of pressure fluid supply to the structure makes it possible to shift the engine valve cycling at any time between any two predetermined conditions, usually between forward operation to reverse operation, and, if desired, an intermediate stop in a neutral position.

For clarity herein, but one train of valve actuating mechanism for one valve per cylinder has been disclosed. In most engine designs each cylinder is provided with two valves, and correspondingly there are then provided four cams for each cylinder, two inlet cams and inlet pushrods for example, two exhaust cams and pushrods and two valve actuating rocker arms. The shifting impulse is imparted to all of the shifting slides of all of the cylinders of the engine simultaneously, but because of the blocking by the tappets previously described, not all of the various slides shift their position from forward to reverse at the same time, but some may shift at different times during the rotation of the engine. If the engine operates on a four-stroke cycle, it may require as many as two complete rotations of the engine crank shaft in order for the shift to be completed. At the usual speeds of operation of engines of this class, the time required for a completed shift is but a small fraction of a second. In practice, the shift time of the present arrangement may be less than the time required axially to shift a cam shaft and may be much less than the time required to lift tappets, then shift a cam shaft and restore the tappets to their new position.

What is claimed is:

1. A valve timing selector for use with an engine having a cam shaft and a reciprocating valve comprising a forward cam on said cam shaft, a reverse cam on said cam shaft, a first cam train including a first follower and a first pushrod operated in a first path by said forward cam, a second cam train including a second follower and a second pushrod operated in a second path by said reverse cam, a rocker in engagement with said valve, means on said rocker including opposite walls defining a cross chamber, a slide reciprocable in said cross chamber and including surfaces slidable on said walls, a forward hook projecting from said slide on one side of said rocker, a reverse hook projecting from said slide on the other side of said rocker, means on said rocker forming a cylinder, means on said slide forming a piston reciprocable in said cylinder, means for supplying said cylinder with actuating fluid to reciprocate said slide in said rocker, a first tappet engaging said first pushrod and engageable with said forward hook when said slide is in one reciprocated position, and a second tappet engaging said second pushrod and engageable with said reverse hook when said slide is in another reciprocated position.

2. A valve timing selector as in claim 1 in which both said forward hook and said reverse hook are out of engagement with said first tappet on said first pushrod and said second tappet on said second pushrod when said slide is in a third reciprocated position.

3. A valve timing selector for use with an engine having a cam shaft and a reciprocating valve comprising a rocker in engagement with said valve, means for mounting said rocker for pivotal movement about a cross axis, means on said rocker defining a cross chamber, a slide on said rocker and reciprocable in said cross chamber in a direction normal to said cross axis, means for so reciprocating said slide in said cross chamber, means for preventing rotation of said slide relative to said rocker, a pair of abutments on said slide and projecting from said cross chamber on opposite sides of said rocker and parallel to said cross axis, and means driven by said cam shaft in different time cycles for interengagement with said respective abutments in different reciprocated positions of said slide.

4. A valve timing selector as in claim 3 in which said means driven by said cam shaft includes tappets having annular shoulders and in which said abutments are oppositely facing hooks adapted to abut said annular shoulders.

5. A valve timing selector as in claim 3 in which said reciprocating means includes a pair of oppositely directed pistons on said slide and includes a pair of oppositely directed cylinders in said rocker for receiving said pistons.

6. A valve timing selector as in claim 3 in which said means driven by said cam shaft includes valve tappets mounted for reciprocation in said rocker arm.

7. A valve timing selector comprising a valve operator having a chamber and having a pair of cylinders of different diameters in alignment and opening into said chamber; means forming a shoulder between the larger of said cylinders and said chamber; a slide movable within said chamber; a first piston reciprocably fitting said smaller cylinder and joined to said slide; a ring reciprocably fitting said larger cylinder and movable therein toward and away from abutment with said shoulder and toward and away from abutment with said slide; a second piston smaller than said first piston and reciprocably fitting said ring and joined to said slide; and means for selectively exerting fluid pressure on said first piston alone, on said second piston and said ring alone, and simultaneously on said first piston, said second piston and said ring.

8. A valve timing selector for use with an engine having a cam shaft and a reciprocating valve comprising a first cam on said cam shaft, a second cam on said cam shaft, a rocker in engagement with said valve, means forming a cross chamber in said rocker open on both sides of said rocker and including upper and lower flat walls, a slide on said rocker disposed within said chamber, means on said slide defining upper and lower flat surfaces slidably engaging said upper and lower flat walls, a first abutment on said slide extending through one open side of said rocker, said first abutment being in the form of a hook facing in one direction, a second abutment on said slide extending through the other open side of said rocker, said second abutment being in the form of a hook facing in the opposite direction, means in said rocker forming a pair of cylinders of different diameters in alignment and opening into said chamber, a first piston on said slide and reciprocably disposed within said smaller cylinder, a ring reciprocably disposed within said larger cylinder, a second piston on said slide and reciprocably disposed within said ring, said second piston being smaller than said first piston, means for selectively supplying pressure fluid to said cylinders, a pair of tappets reciprocably mounted in said rocker on opposite sides of said slide, means on said tappets forming shoulders respectively interengageable with said first abutment hook and said second abutment hook, means including pushrods for connecting said first cam to one of said tappets and said second cam to the other of said tappets, and spring means for urging said tappets toward said cam shaft.

References Cited by the Examiner

UNITED STATES PATENTS

| | | | |
|---|---|---|---|
| 812,840 | 2/1906 | Field et al. | 92—138 |
| 894,682 | 7/1908 | Munden | 123—41 |
| 1,009,023 | 11/1911 | Gagnon et al. | 123—41 |
| 1,416,319 | 5/1922 | Barbour. | |
| 2,475,105 | 7/1949 | Mitton | 92—52 X |
| 2,630,786 | 3/1953 | Poore | 92—52 X |
| 2,667,035 | 1/1954 | Marsden | 92—52 X |
| 3,152,520 | 10/1964 | Heese | 92—52 |

FOREIGN PATENTS 17,649    1913    Great Britain.

MARK NEWMAN, *Primary Examiner.*

WENDELL E. BURNS, *Examiner.*